United States Patent
Goldstein

(12) 
(10) Patent No.: US 6,528,339 B1
(45) Date of Patent: Mar. 4, 2003

(54) METHOD OF IMPARTING BIREFRINGENCE IN A III-V COMPOUND SEMICONDUCTOR

(75) Inventor: Jonathan T. Goldstein, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/968,572

(22) Filed: Oct. 1, 2001

(51) Int. Cl.$^7$ .............................................. H01L 21/00
(52) U.S. Cl. .......................... 438/46; 438/483; 372/21; 359/256; 216/2
(58) Field of Search ................................ 117/87; 216/2; 438/483, 478, 16, 29, 46, 684–706, 718; 257/615, 618; 372/21; 359/256, 328

(56) References Cited

U.S. PATENT DOCUMENTS

| | | | | |
|---|---|---|---|---|
| 5,390,210 A | * | 2/1995 | Fouquent et al. | ............. 372/92 |
| 5,611,856 A | * | 3/1997 | Schunemann et al. | ........ 117/83 |
| 6,304,583 B1 | * | 10/2001 | Ohmer et al. | ................. 372/21 |
| 2001/0004294 A1 | * | 6/2001 | Romanosky | ................ 359/245 |
| 2002/0074537 A1 | * | 6/2002 | John et al. | .................. 252/584 |

OTHER PUBLICATIONS

Ficher et al, "Influence of temperature and transport properties on the birefrinegence of CdGeAs" Journal Appl phys. 81 Apr. 15, 1997.*

Ohmer et al. "Infrared properties of AgGaTe$_2$, a nonlinear optical chalcopyrite semiconductor" Journal of Applied Physics, vol. 86 No. 1, pp. 94–99, Jul. 1, 1999, American Institute of Physics.

Ghiner et al. "Method of integral equations and an extinction theorem for two–dimensional problems in nonlinear optics" Physical Review A, vol. 50 No. 1, pp. 714–723, Jul. 1994, American Physical Society.

Langa et al. "Formation of Porous Layers with Different Morphologies during Anodic Etching on n–In–P" Electrochemical and Solid State Letters, vol. 3. No. 11, pp. 514–516, Nov. 2000, The Electrochemical Society.

* cited by examiner

*Primary Examiner*—Savitri Mulpuri
(74) *Attorney, Agent, or Firm*—Richard A. Lambert; Bobby D. Scearce; Thomas L. Kundert

(57) ABSTRACT

A method of imparting birefringence in a III-V compound semiconductor for sustaining the non linear optical process of second harmonic generation, a birefringent III-V compound semiconductor, and a product of the process are described.

2 Claims, 2 Drawing Sheets

METHOD OF IMPARTING BIREFRINGENCE IN A III-V COMPOUND SEMICONDUCTOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to III-V compound semiconductors and, more specifically to a method of imparting birefringence in a III-V compound semiconductor for sustaining the non linear optical process of second harmonic generation, a birefringent III-V compound semiconductor, and a product of the process.

Lasers have great utility in innumerable applications and their usefulness is well known. Many uses of laser light employed today require, or would benefit from, the availability of a plurality of different frequencies. But, high power output, useful in a wide variety of applications, is limited by wavelength due to the nature of the lasers themselves. For example, $CO_2$ lasers are capable of high power operation but operate at a 10 μm wavelength, which may not be desirable.

Stated differently, it is sometimes desirable for a system to operate at wavelengths that are not produced directly by lasers. Alternatively, the available lasers capable of producing light at the desired wavelength are incapable of producing the requisite power or quality demanded by the contemplated process. In these instances, attempts are made to tune the laser to produce light at different frequencies/wavelengths. This tuning can be achieved in different ways. One such way is to employ the nonlinear optical process of second harmonic generation (SHG) to produce an output light frequency that is double that emanating from the laser. The wavelength is correspondingly halved.

As can be appreciated, the greater the extent to which a laser can be tuned, the wider utility it will have. For example, lasers operating at mid-range infrared wavelengths have great utility in spectroscopy, pollution monitoring, and in military electronic warfare applications, to name a few.

In order to sustain efficient SHG within a material, the material must possess a relatively large coefficient of second order nonlinear susceptibility ($\chi^2$). Since efficient SHG also depends upon efficient phase matching within a material, the material should correspondingly possess an appropriate birefringence (Δn). Birefringence naturally results in an anisotropic crystalline structure, wherein the index of refraction varies with the orientation of the crystalline lattice with respect to the incident light. Birefringence (Δn) is thus quantified as the difference between the refractive indices of light polarized parallel and perpendicular to the optic axis of the crystal. As stated, an appropriate birefringence is desirable in order to sustain efficient SHG which, in turn, will enable efficient tuning of the incident laser light.

The current state-of-the-art material for high-power second harmonic generation of $CO_2$ radiation is $AgGaSe_2$. Recent investigations have been made into the suitability of alloys of $AgGaTe_2$ and AgGaSe as a nonlinear optical material for use in high power tunable solid state laser systems. See, for example, Ohmer et al. *Infrared Properties Of $AgGaTe_2$, A Nonlinear Optical Chalcopyrite Semiconductor*, Journal of Applied Physics, Vol. 86, No. 1 (Jul. 1, 1999) pp. 94–99. An advantage of these materials is that they intrinsically have a high birefringence due to their anisotropic crystalline structure. A disadvantage lies in the average $\chi^2$ value. Another disadvantage lies in the fact that the orientation of the crystalline lattice with respect to the incident laser light is critical and must be precisely controlled. Yet another, perhaps even greater disadvantage to the use of is that the cost of $AgGaSe_2$ and $AgGaTe_2$ is high, and availability of these materials is limited, rendering a their widespread use in laser doubling systems problematic.

A need exists therefore for an improved nonlinear optical material for use in tunable solid state laser systems such as laser doubling. Such a material would be relatively inexpensive, angle insensitive and enable efficient SHG.

SUMMARY OF THE INVENTION

Accordingly, it is a primary object of the present invention to provide a method of imparting birefringence in a III-V compound semiconductor for sustaining the non linear optical process of second harmonic generation and product of the process thereby.

Another object of the present invention is to provide a birefringent III-V compound semiconductor capable of achieving non-critical phase matching for sustaining the non linear optical process of second harmonic generation.

Yet another object of the present invention is to provide a method of imparting birefringence in a III-V compound semiconductor capable of achieving non-critical phase matching.

It is still another object of the present invention to provide a birefringent III-V compound semiconductor requiring no angle tuning with respect to incident laser radiation.

These and other objects of the invention will become apparent as the description of the representative embodiments proceeds.

In accordance with the foregoing principles and objects of the invention, a method of imparting birefringence in a III-V compound semiconductor for sustaining the non linear optical process of second harmonic generation, a birefringent III-V compound semiconductor, and a product of the process are described.

III-V compound semiconductor materials have a very high $\chi^2$ values, making them potentially very useful for sustaining nonlinear processes. Additionally, many III-V compound semiconductor materials have excellent transmission characteristics in the infrared region, from 1 to 15 μm. For example, InP is a material with excellent transmission properties in the entire mid-infrared region from 1 to 13 μm and it has a high $\chi^2$ value of 287 pm/V. And, III-V compound semiconductors are plentiful and relatively inexpensive and thus would appear to be ideal candidate materials for SHG in the infrared region, such as for $CO_2$ laser frequency doubling applications.

The problem with using III-V compound semiconductors in this application is that by nature they are not birefringent. As a result they are not capable of achieving phase matching conditions which are a requisite to efficient nonlinear optical processes such as SHG. Phase matching is essential for effective SHG because it avoids the possibility for destructive interference of the pump and generated waves.

According to an important aspect of the present invention, a III-V compound semiconductor can be made birefringent for sustaining the nonlinear process of SHG by the introduction of a predetermined number of micropipes into the material. The micropipes create an artificial birefringence within the III-V compound semiconductor enabling it to achieve phase matching conditions. Advantageously, due to the large difference between the index of refraction of the air in the micropipe and the index of refraction of the semiconductor material, a relatively small number of micropipes are needed to create a significant birefringence.

According to the method of the present invention, the number of micropipes necessary to achieve the desired birefringence in the material can be calculated by first selecting a generated wavelength value to be output by the second harmonic generation process and determining a corresponding pump wavelength value. Next, using the Sellmeier equations, a bulk index of refraction value of the III-V compound semiconductor for the generated wavelength value is calculated as is the bulk index of refraction for the pump wavelength value. Next, a range of fill factor density values for the III-V compound semiconductor is chosen. The perpendicular index of refraction value and the parallel index of refraction value are calculated for each of the fill factor density values. Then for each fill factor density value, the perpendicular index of refraction value is subtracted from the parallel index of refraction value to obtain a difference value. The optimum fill factor value is then chosen by selecting the fill factor value corresponding the lowest difference value. The fill factor value is then translated into a number of micropipes to be fabricated within the material. The micropipes can then be fabricated in the material by several methods, such as anodic etching, focused ion beam methods and dry etching methods such as reactive ion beam etching.

Advantageously, and according to an important aspect of the present invention, the III-V compound semiconductors modified by the method of the present invention exhibit the highly desirable non-critical phase matching condition during operation, dramatically enhancing the efficiency of operation by eliminating walkoff and the requirement for angle tuning of the material with respect to the incident beam in order to achieve phase matching.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 1:
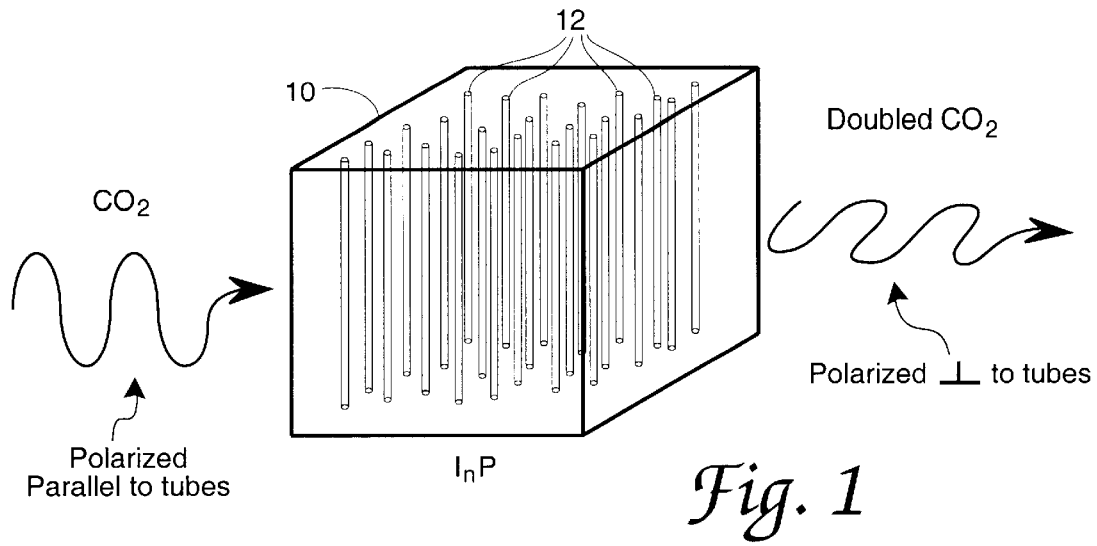
FIG. 1 is a diagrammatic cross sectional view of a representative III-V compound semiconductor having a multiplicity of micropipes passing therethrough.

Reference is made to FIG. 1 showing a representative III-V compound semiconductor 10 having a number of micropipes 12 passing therethrough. As shown, the micropipes 12 pass entirely through the semiconductor 10 material. As will be described in more detail below, the introduction of a predetermined number of micropipes 12 into a III-V compound semiconductor will render the material birefringent and thus able to achieve phase matching conditions. This, in turn, renders the III-V compound semiconductor capable of efficiently sustaining the nonlinear process of Second Harmonic Generation (SHG) for frequency doubling.

As stated above, III-V compound semiconductor materials have a very high $\chi^2$ values, making them potentially very useful for sustaining nonlinear processes. Additionally, many III-V compound semiconductor materials have excellent transmission characteristics in the infrared region, from 1 to 15 $\mu$m. For example, InP is a material with excellent transmission properties in the entire mid-infrared region from 1 to 13 $\mu$m and it has a high $\chi^2$ value of 287 pm/V. And, III-V compound semiconductors are plentiful and relatively inexpensive and thus would appear to be ideal candidate materials for SHG in the infrared region, such as for $CO_2$ laser frequency doubling applications.

The problem with using III-V compound semiconductors in this application is that by nature they are not birefringent. As a result they are not capable of achieving phase matching conditions which are a requisite to efficient nonlinear optical processes such as SHG. Phase matching is essential for effective SHG because it avoids the possibility for destructive interference of the pump and generated waves.

According to an important aspect of the present invention, a III-V compound semiconductor can be made birefringent for sustaining the nonlinear process of SHG by the introduction of a predetermined number of micropipes into the material. The micropipes 12 have very small diameters (on the order of 1 $\mu$m or less) but serve to create an artificial birefringence within the III-V compound semiconductor enabling it to achieve phase matching conditions. Advantageously, the III-V compound semiconductors modified by the method of the present invention exhibit highly desirable non-critical phase matching during operation, dramatically enhancing the efficiency of operation by eliminating walkoff and the requirement for angle tuning of the material with respect to the incident beam in order to achieve phase matching.

As the detailed description of the invention proceeds, the method of the present iinvention will be described in terms of the III-V compound semiconductor material InP. It should be appreciated that the invention is not considered so limited and can be satisfactorily applied to other III-V compounds without departing from the spirit and scope of the invention.

The micropipes 12 introduced into the material take advantage of a large difference between the index of refraction of the air in the micropipes 12 and the index of refraction of the semiconductor material. Thus, a significant birefringence can be obtained by a relatively few number of micropipes 12. As stated, the diameter of the micropipes 12 is quite small and is fixed by the Effective Medium Theory. This gives a micropipe diameter equal to one tenth the shortest wavelength expected to pass through the material. For example, for use as a $CO_2$ doubler, a maximum diameter of about 0.5 micron would be appropriate. Smaller diameter micropipes 12 than the maximum will also provide satisfactory results and may be simpler to fabricate.

According to the method of the present invention, the number of micropipes 12 necessary to achieve the desired birefringence in the material can be calculated by first selecting a generated wavelength value to be output by the second harmonic generation process and determining a corresponding pump wavelength value. For example, for a 5 $\mu$m generated wavelength, the pump wavelength would be 10 $\mu$m.

Next, a bulk index of refraction value of InP for the generated wavelength value (here 5 $\mu$m) is calculated using the Sellmeier equation. The Sellmeier equation is known to those skilled in the art. Basically, in optical materials, the refractive index is frequency dependent. This dependence can be calculated for a given material using a Sellmeier equation of the form:

$$n = P_1 + \frac{P_2\lambda^2}{\lambda^2 - P_3^2} + \frac{P_4\lambda^2}{\lambda^2 - P_5^2}$$

wherein $\lambda$ represents wavelength. The Coefficients $P_1$–$P_5$ vary for each material, and can be obtained from the literature for all bulk III-V materials commonly used today. See, for example, Handbook of Infrared Optical Materials, edited by Paul Klocek, (New York, Marcel Dekker Inc., 1991), pg. 275. In the case of InP, the Sellmeier coefficients are:

$P_1$=2.1253
$P_2$=0.94913
$P_3$=0.46057
$P_4$=2.57885
$P_5$=114.48092

In the same way, the bulk index of refraction for the pump wavelength (here 10 $\mu$m) is calculated.

Figure 2:
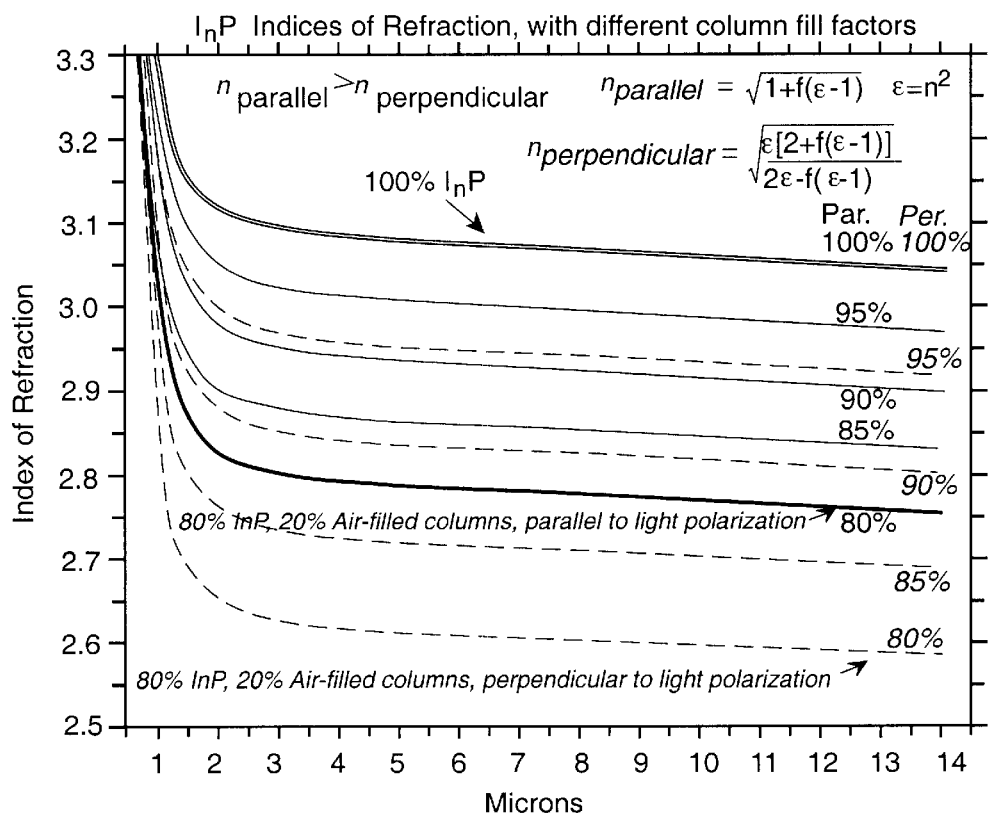
FIG. 2 is a graph showing InP indexes of refraction for different fill factors for rays polarized parallel to the direction of the micropipes and for rays polarized perpendicular to the direction of the micropipes.
Figure 3:
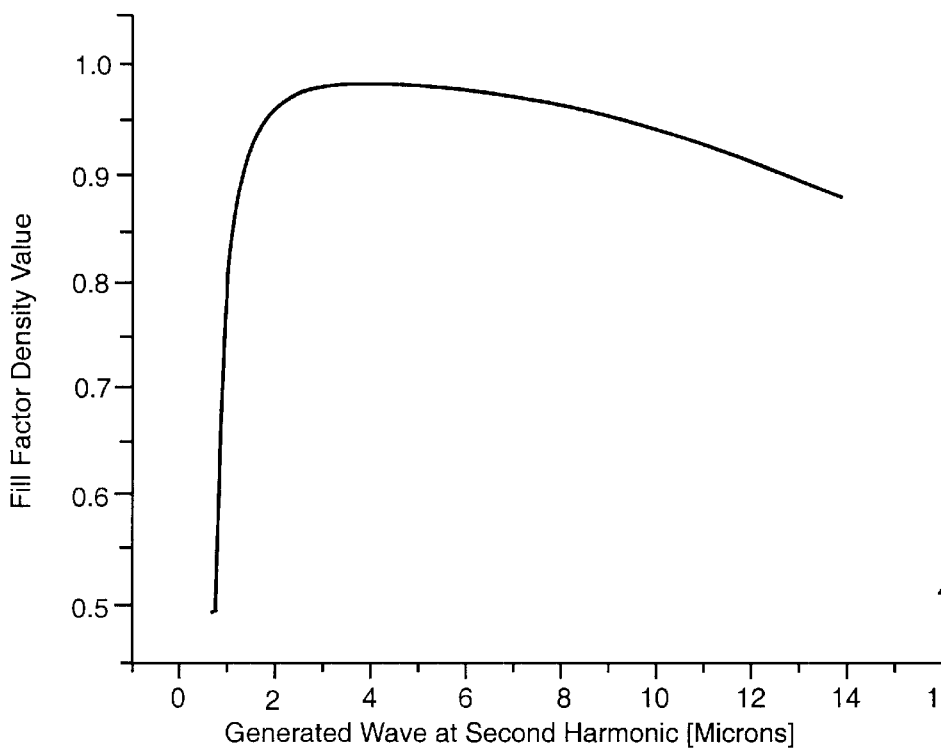
FIG. 3 is a graph showing the generated wavelength versus fill factor for InP.
Figure 4:
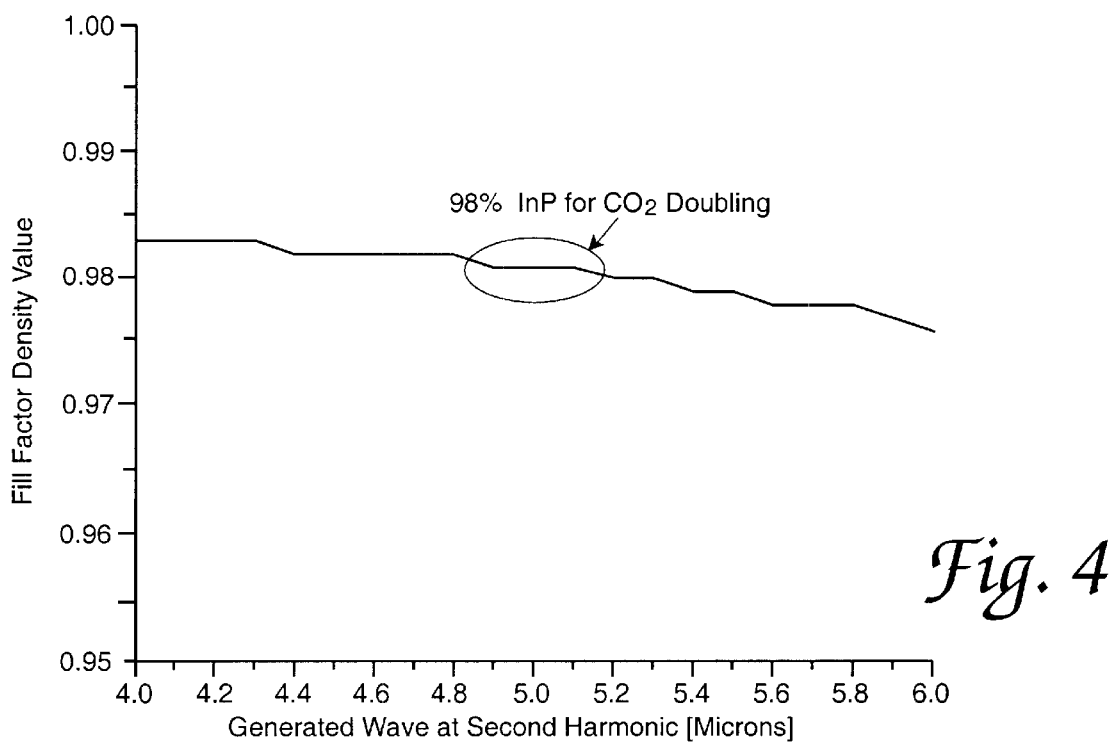
FIG. 4 is an enlarged view of a portion of the graph of FIG. 3.

Next, a range of fill factor density values is chosen. As stated above, due to the large difference of refraction between the InP material and air, the number of micropipes 12 (fill factor density) is relatively small, and thus, a higher range, beginning at 0.5 or greater can often be assumed as a starting point. For example, a range of fill factor density values might be (0.5, 0.51, 0.52 . . . 1.0). For the case of InP, see FIGS. 3 and 4 wherein the fill factor value for $CO_2$ is shown versus the SHG generated wavelength. As shown, only a 2% concentration of micropipes 12 (fill factor 0.98) is needed to achieve phase matching. See also FIG. 2 wherein the effect of varying the fill factor density values upon the indexes of refraction is dramatically illustrated. The solid lines represent rays polarized parallel to the direction of the micropipes 12, the dashed lines represent rays polarized perpendicular to the direction of the micropipes 12.

A perpendicular index of refraction is then derived for the material using the following equation:

$$n_{perpendicular} = \sqrt{\frac{\varepsilon[2 + f(\varepsilon - 1)]}{2\varepsilon - f(\varepsilon - 1)}}$$

wherein $\varepsilon = n^2$; n being the bulk index of refraction calculated above for the generated wavelength value and f being equal to the first fill factor density value from the range chosen above.

A parallel index of refraction is derived for the material using the bulk index of refraction calculated above for the pump wavelength value using the following equation:

$$n_{parallel} = \sqrt{1 + f(\varepsilon - 1)}$$

wherein $\varepsilon = n^2$; n being the bulk index of refraction calculated above for the pump wavelength value and f being equal to the first fill factor density value from the range chosen above.

Next, $n_{perpendicular}$ is subtracted from $n_{parallel}$ to obtain a difference value. These three steps are then repeated for each fill factor density value f from the range above. The lowest difference value obtained from the subtracting step corresponds to the optimum fill factor value. In the case of SHG in InP using a $CO_2$ laser as the pump wavelength, the optimum fill factor value is 0.98.

The optimum fill factor value is translated into the number of micropipes 12 to be fabricated by figuring the volume fraction of air from the optimum fill factor value calculated above. In the InP example, the volume fraction of air is 0.02 (1−0.98=0.02). Therefore for each square millimeter of InP, air occupies 2% or 0.02 mm$^2$. As stated above, for use as a $CO_2$ doubler, a maximum micropipe diameter of about 0.5 micron would be appropriate according to the Effective Medium Theory. Here, micropipes 12 having a 0.2 micron (0.2×10$^{-3}$ mm) diameter D are chosen. The number of micropipes 12 ($N_m$) is a function of the relative surface area of the micropipes 12 in relation to the whole:

$$N_m(\pi D^2/4) = 0.02 \text{ mm}^2$$

In the present example, the number $N_m$ of micropipes 12 to be fabricated is 636,620 per mm$^2$.

There are variety of ways in which the required micropipes 12 may be fabricated. And, these can be combined in various ways in order to optimize the fabrication process. For example, a method of fabrication might include patterning the surface with a lithographic pattern, in order to "start" the pipes. The patterning could be done in several different ways (e-beam nanolithography, conventional, holographic, or maskless focused ion beam). Next, the pattern would be etched in order to create the "starter pits" for the anodic etching. This, too, could be achieved in many different ways: Reactive Ion Etching (RIE) and its various improvements such as Electron Cyclotron Resonant plasma RIE (ECR-RIE), Inductively Coupled Plasma RIE (ICP-RIE), Deep Reactive Ion Etching (DRIE), Chemically Assisted Ion Beam Etching (CAIBE), and low-temperature RIE variants).

Alternatively, one could skip this entire "pre-patterning" process, and proceed directly to the anodic etch. See, for example, Langa et al. *Formation of Porous Layers with Different Morphologies during Anodic Etching of n-InP, Electrochemical And Solid-State Letters,* Vol. 3, no. 11 (November 2000) pp. 514–516.

Or, one could skip the anodic etch, and attempt to obtain the required aspect ratio by continuing the dry etch process. Other choices would include, for example, focused ion beam milling or Focused Proton Beam Micro-Machining, or Electro-Discharge Machining.

As can be appreciated, the choice of fabrication process is vast and can depend on a multitude of factors, including, applicability of the method to the material itself, as well as cost and availability. The invention is not considered limited to any particular process.

The micropipes 12 can have either a random distribution within the III-V compound semiconductor 10, or they can be arranged in a regular fashion. For example, the micropipes 12 can be arranged in a regular, square array or a hexagonal close packed array. In the case of InP used as a $CO_2$ frequency doubler, the distance between centers of the micropipes 12 in the square array would be 125 $\mu$m. And, the distance between centers of the micropipes 12 in the hexagonal close packed array would be 156 $\mu$m.

In summary, numerous benefits have been described from utilizing the principles of the present invention. A method of modifying a II-V compound semiconductor for sustaining the non linear optical process of second harmonic generation, a product of the process and a III-V birefringent compound semiconductor are described. For the purposes of illustration and description, InP was chosen as a representative III-V compound semiconductor. It should be appreciated, however, that the invention can be applied satisfactorily to any III-V compound semiconductor material.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. A method of modifying a III-V compound semiconductor for sustaining the non linear optical process of second harmonic generation, comprising the steps of:

providing a III-V compound semiconductor;

determining a number of micropipes for imparting a birefringence within said III-V compound semiconductor so as to enable second harmonic generation phase matching at a predetermined wavelength;

fabricating said number of micropipes within said III-V compound semiconductor.

2. A method of modifying a III-V compound semiconductor for sustaining the non linear optical process of second harmonic generation, comprising the steps of:

providing a III-V compound semiconductor;

selecting a generated wavelength value to be output by the second harmonic generation process within said III-V compound semiconductor;

determining a pump wavelength value corresponding to said generated wavelength value;

calculating a bulk index of refraction value of said III-V compound semiconductor for said generated wavelength value;

calculating a bulk index of refraction value of said III-V compound semiconductor for said pump wavelength value;

choosing a range of fill factor density values for said III-V compound semiconductor;

deriving a perpendicular index of refraction value using the relation $$n_{perpendicular} = \sqrt{\frac{\varepsilon[2 + f(\varepsilon - 1)]}{2\varepsilon - f(\varepsilon - 1)}}$$

wherein $\epsilon$ is equal to the square of said bulk index of refraction value from said generated wavelength value calculating step above and $f$ is equal to a first fill factor density value from said range of fill factor density values;

deriving a parallel index of refraction value using the relation $$n_{parallel} = \sqrt{1 + f(\epsilon - 1)}$$

wherein $\epsilon$ is equal to the square of said bulk index of refraction value from said pump wavelength value calculating step above and $f$ is equal to a first fill factor density value from said range of fill factor density values;

subtracting said perpendicular index of refraction value from said parallel index of refraction value to obtain a difference value;

repeating said deriving and said subtracting steps above for each successive fill factor density value within said range of fill factor density values;

selecting an optimum fill factor value by selecting the fill factor value corresponding to the lowest difference value obtained from said repeating step above;

translating said optimum fill factor value into a number corresponding to a number of micropipes to be fabricated within the III-V compound semiconductor; and, fabricating said number of micropipes within said III-V compound semiconductor.

* * * * *

UNITED STATES PATENT AND TRADEMARK OFFICE
CERTIFICATE OF CORRECTION

PATENT NO.    : 6,528,339 B1
DATED         : March 4, 2003
INVENTOR(S)   : Jonathan T. Goldstein It is certified that error appears in the above-identified patent and that said Letters Patent is hereby corrected as shown below:

Column 4,
Line 39, "iinvention" should read -- invention --.

Column 5,

Line 57, "$n_{parallel} = \sqrt{1 + f(\in -1)}$" should read -- $n_{parallel} = \sqrt{1 + f(\varepsilon - 1)}$ --.

Line 59, "$\in = n^2$" should read -- $\varepsilon = n^2$ --.

Column 6,
Line 17, "Nm" should read -- $N_m$ --.
Line 62, "II-V" should read -- III-V --.

Column 8,
Lines 10 and 22, "$\in$" should read -- $\varepsilon$ --.

Line 19, "$n_{parallel} = \sqrt{1 + f(\in -1)}$" should read -- $n_{parallel} = \sqrt{1 + f(\varepsilon - 1)}$ --.

Signed and Sealed this

Eighth Day of July, 2003

JAMES E. ROGAN
*Director of the United States Patent and Trademark Office*